United States Patent [19]

Sunderman et al.

[11] Patent Number: 6,084,943
[45] Date of Patent: *Jul. 4, 2000

[54] DIAGNOSTIC DEVICE FOR A TELEPHONE SYSTEM

[75] Inventors: Kurt E. Sunderman, Geneva; John P. Lenihan, Wheaton, both of Ill.

[73] Assignee: Rockwell International Corp., Costa Mesa, Calif.

[*] Notice: This patent is subject to a terminal disclaimer.

[21] Appl. No.: 08/283,493

[22] Filed: Aug. 1, 1994

Related U.S. Application Data

[63] Continuation of application No. 07/886,271, May 19, 1992, abandoned.

[51] Int. Cl.[7] .......................... H04M 1/24; H04M 15/00
[52] U.S. Cl. ................................. 379/1; 379/140
[58] Field of Search .............................. 379/1, 9, 10, 13, 379/15, 34, 112, 113, 265, 266, 111, 114, 115, 121, 130, 131, 132, 133, 140, 220, 221

[56] References Cited

U.S. PATENT DOCUMENTS

| | | | |
|---|---|---|---|
| 3,893,024 | 7/1975 | Reines et al. | 379/15 |
| 4,345,324 | 8/1982 | Smitt | 379/15 |
| 4,439,826 | 3/1984 | Lawrence et al. | 379/15 |
| 4,559,416 | 12/1985 | Theis et al. | 379/34 |
| 4,631,363 | 12/1986 | Foster et al. | 379/34 |
| 4,764,949 | 8/1988 | Faith et al. | 379/9 |
| 4,788,718 | 11/1988 | McNabb et al. | 379/113 |
| 4,800,583 | 1/1989 | Theis | 379/266 |
| 4,835,683 | 5/1989 | Phillips et al. | 379/9 |
| 4,935,956 | 6/1990 | Hellwarth et al. | 379/114 |
| 4,945,554 | 7/1990 | Krause et al. | 379/10 |
| 5,020,095 | 5/1991 | Morganstein | 379/266 |
| 5,023,868 | 6/1991 | Davidson | 379/112 |
| 5,025,468 | 6/1991 | Sikand | 379/266 |
| 5,062,103 | 10/1991 | Davidson et al. | 379/112 |
| 5,113,433 | 5/1992 | Hird et al. | 379/130 |
| 5,134,652 | 7/1992 | Brown | 379/266 |
| 5,164,983 | 11/1992 | Brown et al. | 379/112 |
| 5,241,580 | 8/1993 | Babson, III | 379/15 |
| 5,247,569 | 9/1993 | Cave | 379/113 |
| 5,295,183 | 3/1994 | Langlois et al. | 379/113 |
| 5,295,184 | 3/1994 | Smith | 379/266 |
| 5,309,505 | 5/1994 | Szlam | 379/265 |
| 5,359,649 | 10/1994 | Rosu et al. | 379/220 |
| 5,390,232 | 2/1995 | Freeman | 379/10 |
| 5,488,648 | 1/1996 | Womble | 379/13 |
| 5,509,055 | 4/1996 | Ehrlich et al. | 379/133 |
| 5,528,676 | 6/1996 | Sussell et al. | 379/133 |
| 5,539,802 | 7/1996 | De Caluwe | 379/15 |

OTHER PUBLICATIONS

"GTD–1000 digital PABX CAS Main/ACD" GTE Automatic Electrical Journal (Nov. 1980) pp. 182–193.
"Digital PBX CAS Main/ACD"; by Tapper & Thatte; pp. 182–193; Nov. 1980, GTE Automatic Electric Journal.
AT&T "5ESS Switch ACD/MIS" Issue 2, Aug. 1990; pp. 1–106.
ACD in ROLM CBX; ICC80, 1980.
The Smart Way to Handle Incoming Callers.

*Primary Examiner*—Vijay Shankar
*Attorney, Agent, or Firm*—Welsh & Katz, Ltd.

[57] ABSTRACT

A diagnostic device (12) for a telephone system (14) having a computer (10) having a memory, a compiler in the memory, and a plurality of high level statements (16) for controlling the flow of telephone calls in the system (14), and a device (10) responsive to a set of statements (16) defined for the program for determining diagnostic information associated with the steps of the program.

24 Claims, 2 Drawing Sheets

FIG. 2

APPLICATION VECTOR STEP PROFILE REPORT

PRINTED: JANUARY 24, 1992 11:21 AM

COVERING: 12/21/91 11:00 PM TO 11:30 PM, SPAN= 1800 SECS.

PAGE 1

| STEP | #OF STEPS EXEC | #OF CALLS HNDLD | #OF CALLS ABND | CALLS INTCP | CALLS DISC | TIME (SECS) | AVE | STATEMENT |
|---|---|---|---|---|---|---|---|---|
| VECTOR#: 1 VECTOR NAME: APPL_VEC_3 VECTOR VERSION: 1 | | | | | | | | |
| 1 | 2 | 0 | 0 | 0 | 0 | 0 | 0 | PLAY ANNOUNCEMENT 1 |
| 2 | 1 | 0 | 0 | 0 | 0 | 15 | 15 | QUEUE AGENT 1 |
| 3 | 1 | 0 | 0 | 0 | 0 | 22 | 22 | DELAY 15 |
| 4 | 1 | 0 | 0 | 0 | 0 | 35 | 35 | STOP |
| VECTOR SBTTL | 2 | 0 | 0 | 0 | 0 | | 20 | |

DIAGNOSTIC DEVICE FOR A TELEPHONE SYSTEM

This is a continuation of application Ser. No. 07/886,271, filed May 19, 1992, now abandoned.

BACKGROUND OF THE INVENTION

The present invention is concerned with telephone systems.

In the past, programs comprising a plurality of steps, termed vectors, have been provided for a computer which controls the telephone system. In a preferred form, the steps are written in such a manner that the user of the system may easily write a program for control of the telephone system.

Although such systems have been very useful in defining how the telephone system should handle a telephone call, occasionally the vector may be written with an error possibly due to inexperience of the user providing control of the system. Until the present time, it has been sometimes difficult to determine when an error has occurred, and it has also been difficult to determine the particular cause for the error such as to facilitate correction of the error by the user.

In addition, the present systems should provide additional information concerning operation of the vector in order to enhance the diagnostic capabilities of the system, and, in particular, information concerning the time which elapses to any given step of the vector. Without knowing the time which has elapsed to a particular step, the correction of the program when an error has occurred is rendered more difficult.

SUMMARY OF THE INVENTION

A principle feature of the present invention is the provision of a diagnostic device for a telephone system.

The diagnostic device of the present invention comprises a computer having a memory, a control program in the memory, and a plurality of high level statements for controlling calls in the telephone system.

A feature of the present invention is the provision of means responsive to a set of statements defined for the program for determining diagnostic information associated with the steps of the program.

Another feature of the invention is that the diagnostic information may comprise the number of steps executed in the program.

A further feature of the invention is the diagnostic information may comprise the number of telephone calls handled by a step of the vector in the system.

Another feature of the invention is that the diagnostic information may comprise the number of telephone calls abandoned while executing a specific step of a vector.

Yet another feature of the invention is that the diagnostic information may comprise the number of telephone calls intercepted while executing a specific step of a vector.

Still another feature of the invention is that the diagnostic information may comprise the number of telephone calls disconnected while executing a specific step of a vector.

A feature of the invention is that the diagnostic information may comprise the cumulative time to any step in the vector.

A further feature of the invention is that the diagnostic information may comprise the average time to the steps in the program.

Thus, a feature of the invention is that the device greatly facilitates verifying proper operation of the vector.

Yet another feature of the invention is that the user of the program may easily utilize the device for correcting possible errors in the vector.

Further features will become more fully apparent in the following description of the embodiments of the present invention, and from the appended claims.

DESCRIPTION OF THE DRAWINGS

In the drawings:

FIG. 2 is a report setting forth information concerning the diagnostic device of the present invention.

DESCRIPTION OF THE PREFERRED EMBODIMENTS

Figure 1:
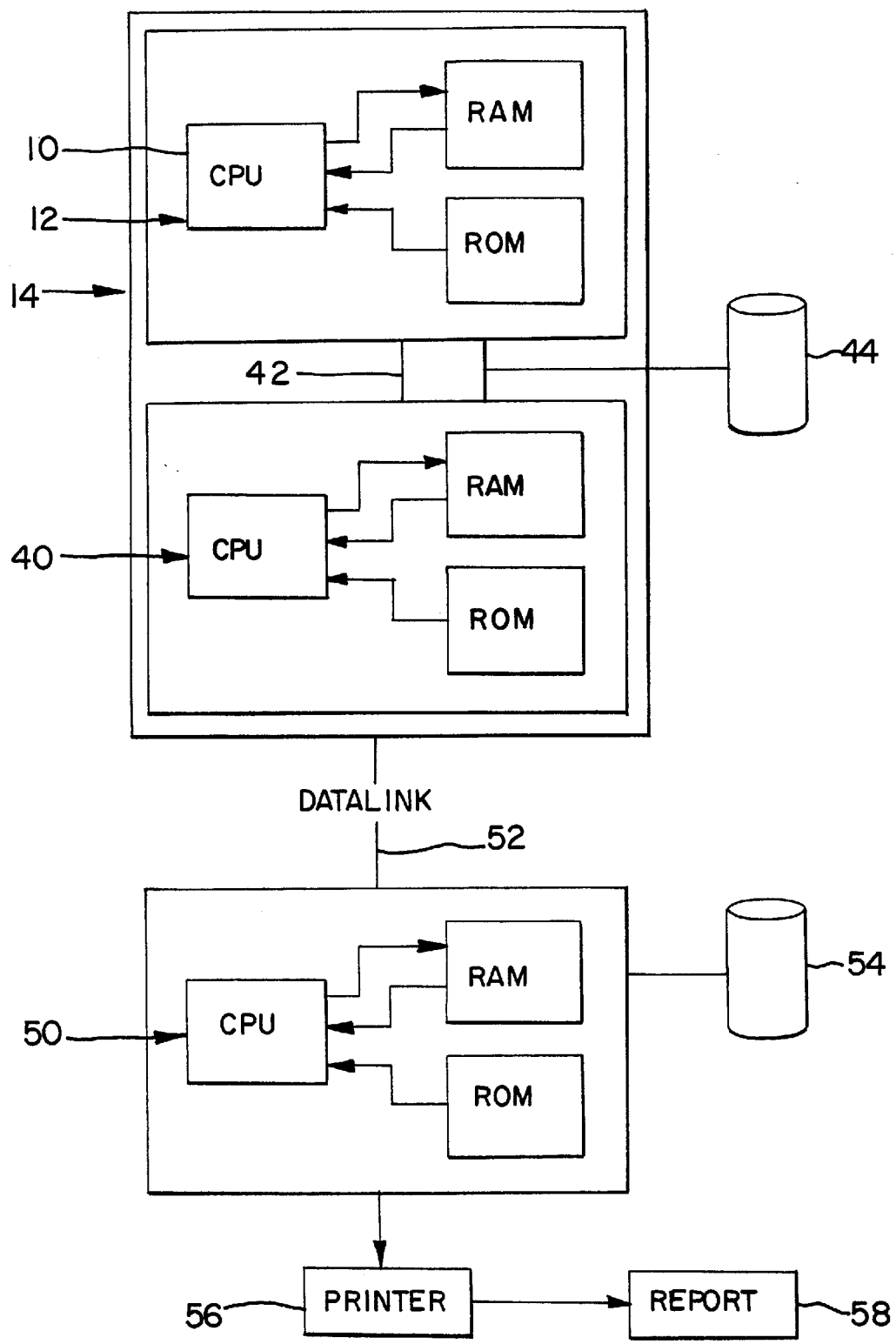
FIG. 1 is a block diagram of a computer for use in connection with a telephone system and a diagnostic device of the present invention for the system.

Referring now to FIG. 1, there is shown a master computer 10 or Central Processing Unit (CPU) having a Randomly Addressable Memory (RAM) and Read Only Memory (ROM) having a diagnostic device generally designated 12 in the memory of the computer 10 for controlling the flow of telephone calls in a telephone system generally designated 14. As will be seen below, the diagnostic device 12 comprises a program which is written for the memory of the computer 10, and for execution of the computer 10 as controlled by the user of the system 14.

The system 14 has a second auxiliary computer 40 or Central Processing Unit (CPU) having a Random Access Memory (RAM) and Read Only Memory (ROM), with the second auxiliary computer 40 communicating with the first computer 10 over a data bus 42, and with both computers 10 and 40 communicating with a hard disc 44. The second computer 40 or CPU serves as an Input/Output (I/O) for the first computer 10. The second computer 40 may also communicate with external devices, such as a Cathode Ray Tube (CRT).

The system 14 also has a third external computer 50 or Central Processing Unit (CPU) having a Random Access Memory (RAM) and Read Only Memory (ROM) which communicates with the second computer 40 over a data link 52, and also communicates with a hard disc 54. As shown, the third computer 50 controls a suitable printer 56 in order to print reports 58.

With reference to FIG. 2, the diagnostic device 12 comprises a plurality of high level statements 16 which are defined for a compiler in the memory of the computer 10. The statements 16 are defined such that the user of the telephone system 14 may easily write a program for handling telephone calls and controlling the flow of telephone calls in the system 14. However, in certain instances the written program may include one or more errors which are usually difficult to detect and correct in the program.

In accordance with the present invention, the program in the computer 50 automatically prints out a report 58 on the printer 56 concerning operation for the set of statements executed in the program, termed a vector. Thus, the computer 50 prints out the report 58 which initially contains the set of statements 16 which are executed.

As shown, the printed report 18 includes diagnostic information 22 associated with each of the statements 16 in the vector 20. The diagnostic information may be set forth in columns for clarity, such as the number of steps 24 executed in the program or vector, the number of telephone calls handled 26 by the vector, the number of telephone calls abandoned 32 by the vector, the number of telephone calls intercepted or interrupted 28 in the vector 20, and the number of telephone calls disconnected 30 during operation of the vector 20. In this form, the number of calls handled indicates the number of calls connected to agents, the number of calls abandoned indicates the number of calls which are hung up by the caller before the calls were handled, the number of calls intercepted indicates the number of calls which are taken out of the given vector and are transferred to a special intercept vector for special handling in the case of an error in the system 10, and the number of calls disconnected indicates the number of calls which were cut off by the system 10, such as calls for receiving an announcement only in the absence of agents on a week end.

As indicated, the number of occurrences of the diagnostic information is set forth in the various columns of the report 18 corresponding to a set of telephone calls. This information may first be utilized to determine a possible error which took place during operation of the vector 20, and also provides information to assist correction of the program in a rapid and simplified manner.

The cumulative time 34 for each step, which may be stored in the memory of one of the computers without being printed, may also be divided by the number of calls in order to determine the average time 36 to execute each step. This time information is also useful for correcting any possible errors in the program. For example, the vector 20 which is determining data may indicate that a large number of calls are abandoned on a step 10 of a suitable program. The reason for abandonment of these calls may be the content of an announcement, or just that the callers became tired of waiting during execution of the vector 20. This information assists the user to determine the time required to get to a particular step in the program, and assists in analyzing the performance of a vector 20. The preferred time data is the average time to a step 36 since the progression of calls through a vector 20 is not always linear do to conditioned branching.

Thus, in accordance with the present invention, a diagnostic device 12 is provided in association with a vector 20 or program comprising a plurality of high level statements in a compiler in a telephone system 14. The diagnostic information obtained is useful for the user to detect possible errors in the program and to correct such errors in a simplified manner.

The foregoing detailed description has been given for clearness of understanding only, and no unnecessary limitations should be understood therefrom, as modifications will be obvious to those skilled in the art.

What is claimed is:

1. A testing device for a telephone system, comprising:
a computer having a memory, a control program in said memory, and a plurality of selectable computer instructions for controlling the flow of telephone calls in the system; and
means responsive to a set of selected computer instructions for automatically determining test information associated with the control program without intervention by an operator, wherein the test information comprises the number of times each instruction is executed.

2. A testing device for a telephone system, comprising:
a computer having a memory, a control program in said memory, and a plurality of selectable computer instructions for controlling the flow of telephone calls in the system; and
means responsive to a set of said selected instructions defined in the control program for automatically determining the average time to the instructions in said control program without intervention by an operator.

3. A testing device for a telephone system, comprising:
a computer having a memory, a control program in said memory, and a plurality of selectable computer instructions for controlling the flow of telephone calls in the system; and
means responsive to a set of selected computer instructions for automatically determining test information associated with the control program without intervention by an operator, wherein the test information comprises the number of telephone calls handled during the execution of each instruction of a vector.

4. A testing device for a telephone system, comprising:
a computer having a memory, a control program in said memory, and a plurality of selectable computer instructions for controlling the flow of telephone calls in the system; and
means responsive to a set of selected computer instructions for automatically determining test information associated with the control program without intervention by an operator, wherein the test information comprises the number of telephone calls abandoned during the execution of each instruction of a vector.

5. A testing device for a telephone system, comprising:
a computer having a memory, a control program in said memory, and a plurality of selectable computer instructions for controlling the flow of telephone calls in the system; and
means responsive to a set of selected instructions for automatically determining test information associated with the control program without intervention by an operator, wherein the test information comprises the number of telephone calls intercepted during the execution of each instruction of a vector.

6. A test device for a telephone system, comprising:
a computer having a memory, a control program in said memory, and a plurality of selectable computer instructions for controlling the flow of telephone calls in the system; and
means responsive to a set of selected instructions for automatically determining test information associated with the control program without intervention by an operator, wherein the test information comprises the number of telephone calls disconnected during the execution of each instruction of a vector.

7. A testing device for a telephone system, comprising:
a computer having a memory, a control program in said memory, and a plurality of selectable computer instructions for controlling the flow of telephone calls in the system; and
means responsive to a set of selected instructions for automatically determining test information associated with the control program without intervention by an operator, wherein the test information comprises the average time to each instruction in a vector.

8. A testing device for a telephone system, comprising:
a computer, adapted to execute a plurality of control instructions; and
an instruction counter responsive to each occurrence of the computer executing each instruction of a set of selected control instructions, the set of selected control instructions comprising at least one of the plurality of control instructions.

9. The testing device of claim 8, wherein the instruction counter further comprises a location in memory corresponding to a number of occurrences of execution of each instruction of the set of selected control instructions.

10. A testing device for a telephone system, comprising:
   a computer, adapted to execute the plurality of control instructions; and
   a call counter, responsive to each occurrence of the telephone system routing a telephone call, and responsive to each occurrence of the computer executing each instruction of a set of selected control instructions, the set of selected control instructions comprising at least one of the plurality of control instructions.

11. The testing device of claim 10, wherein the call counter further comprises at least one location in memory corresponding to a number of telephone calls handled during the execution of each instruction of the set of selected control instructions.

12. The testing device of claim 10, wherein the call counter further comprises at least one location in memory corresponding to a number of telephone calls abandoned during the execution of each instruction of the set of selected control instructions.

13. The testing device of claim 10, wherein the call counter further comprises at least one location in memory corresponding to a number of telephone calls intercepted during the execution of each instruction of the set of selected control instructions.

14. The testing device of claim 10, wherein the call counter further comprises at least one location in memory corresponding to a number of telephone calls disconnected during the execution of each instruction of the set of selected control instructions.

15. A testing device for a telephone system, comprising:
   a computer, adapted to execute a plurality of control instructions; and
   a timer, responsive to each occurrence of the computer executing each instruction of a set of selected control instructions, the set of selected control instructions comprising at least one of the plurality of control instructions.

16. The testing device of claim 15, wherein the timer further comprises at least one location in memory corresponding to an elapsed period of time to execute each instruction of the set of selected control instructions.

17. A method for testing a plurality of control instructions for a telephone system, comprising the steps of:
   a) selecting a set of instructions; and
   b) recording each occurrence that a computer executes each instruction of the set of selected instructions.

18. A method for testing a plurality of control instructions in a telephone system, comprising the steps of:
   a) selecting a set of instructions; and
   b) recording the status of telephone calls during the execution of each instruction of the set of selected instructions.

19. The method of claim 18, wherein the step of recording the status of telephone calls during the execution of each instruction of the set of selected instructions includes recording the number of telephone calls handled during the execution of each instruction.

20. The method of claim 18, wherein the step of recording the status of telephone calls during the execution of each instruction of the set of selected instructions includes recording the number of telephone calls abandoned during the execution of each instruction.

21. The method of claim 18, wherein the step of recording the status of telephone calls during the execution of each instruction of the set of selected instructions includes recording the number of telephone calls intercepted during the execution of each instruction.

22. The method of claim 18, wherein the step of recording the status of telephone calls during the execution of each instruction of the set of selected instructions includes recording the number of telephone calls disconnected during the execution of each instruction.

23. A method for testing a plurality of control instructions in a telephone system, comprising the steps of:
   a) selecting a set of instructions; and
   b) recording the cumulative time to execute each instruction in the set of selected instructions.

24. The method of claim 23, further comprising the step of computing the average time to execute each instruction in the set of selected instructions from the cumulative time to execute each instruction.

* * * * *